United States Patent
Wu et al.

(10) Patent No.: US 8,786,820 B2
(45) Date of Patent: Jul. 22, 2014

(54) DISPLAY DEVICE AND METHOD OF FABRICATING THE SAME

(75) Inventors: Ho-Chien Wu, Hsin-Chu (TW); Chia-Tien Peng, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 603 days.

(21) Appl. No.: 13/073,968

(22) Filed: Mar. 28, 2011

(65) Prior Publication Data

US 2012/0120364 A1    May 17, 2012

(30) Foreign Application Priority Data

Nov. 11, 2010  (TW) .............................. 99138806 A (51) Int. Cl.
*G02F 1/1333* (2006.01)
*G02F 1/1339* (2006.01)
*G02F 1/1345* (2006.01)

(52) U.S. Cl.
USPC ............................ 349/158; 349/153; 349/150

(58) Field of Classification Search
USPC .................... 349/158, 159, 160, 153
See application file for complete search history.

(56) References Cited

U.S. PATENT DOCUMENTS

| | | | |
|---|---|---|---|
| 5,995,172 A * | 11/1999 | Ikeda et al. | 349/12 |
| 6,429,530 B1 | 8/2002 | Chen | |
| 2003/0184704 A1 * | 10/2003 | Akiyama et al. | 349/158 |
| 2006/0221291 A1 * | 10/2006 | Hong et al. | 349/153 |
| 2009/0021678 A1 * | 1/2009 | Son et al. | 349/122 |
| 2009/0184919 A1 * | 7/2009 | Shinn et al. | 345/107 |
| 2010/0028565 A1 | 2/2010 | Shinn | |
| 2010/0208188 A1 * | 8/2010 | Tsai et al. | 349/153 |
| 2010/0265565 A1 | 10/2010 | Wang | |

FOREIGN PATENT DOCUMENTS

| | | |
|---|---|---|
| CN | 101566774 A | 10/2009 |
| TW | 421855 | 2/2001 |
| TW | 489444 | 6/2002 |
| TW | 200707701 | 2/2007 |
| TW | 201005696 | 2/2010 |
| TW | 201039037 | 11/2010 |

* cited by examiner

*Primary Examiner* — Wen-Ying P Chen
(74) *Attorney, Agent, or Firm* — Winston Hsu; Scott Margo (57) ABSTRACT

A display device includes a substrate, a backplane, a display medium layer, a protective layer, a driving component, a flexible printed circuit (FPC) and a sealant. The backplane and the display medium layer are disposed on the lower side and the upper side of the substrate, respectively. The protective layer covers the display medium layer and prevents moisture and oxygen from permeating into the display medium layer to deteriorate its performance. The sealant surrounds the first side surface of the substrate and the second side surface of the display medium layer, and wraps at least a portion of the driving component and a portion of the FPC. Additionally, a manufacturing method of a display device is also provided.

28 Claims, 13 Drawing Sheets

DISPLAY DEVICE AND METHOD OF FABRICATING THE SAME

BACKGROUND OF THE INVENTION

1. Field of the Invention

The present invention is related to a display device and a method of fabricating the same display device, and more particularly, to a package structure of a flexible display device and the method of fabricating the same.

2. Description of the Prior Art

The conventional electrophoretic display device includes a substrate; a display medium layer used as a medium for image display; a protective layer used to insulate moisture and oxygen from the display medium layer; a sealant for packaging the periphery of the electrophoretic display device; and a driving component and a flexible printed circuit (FPC) used to drive the electrophoretic display device. After the driving component and the flexible printed circuit are individually connected to the substrate, mostly, a film of protection glue such as Tuffy glue would be coated on the driving component and a portion of flexible printed circuit for protection. Generally, the substrate is made of glass or plastic, and the organic polymeric layers, such as the display medium layer, the protective layer and etc., are disposed on the substrate. The small Young's modulus and the film thickness of the polymeric layers make the polymeric layers flexible, though; it is unfavorable to the strain resistance. In the high temperature process, the difference of coefficient of thermal expansion (CTE) between the substrate and the polymeric layers causes warpage of the polymeric layers which adversely impacts subsequent process. Specifically, the difference of CTE would induce serious stress residual, lead to the breaking of glass substrate, and lower the reliability, the yield and the productivity. Further, in addition to protecting the medium display layer with the sealant, the protection glue is utilized to protect the driving component and the flexible printed circuit disposed on the substrate. This additional package step complicates the package process of the conventional display device.

SUMMARY OF THE INVENTION

It is therefore one of the objectives of the present invention to provide a display device and a method of fabricating the same display device to solve the existing problems and simplify the package process.

A display device according to an exemplary embodiment of the present invention is provided. The display device includes a substrate; a display medium layer disposed on a second surface of the substrate; a driving component disposed on the substrate, a flexible printed circuit disposed on the substrate and electrically connected to the driving component; a protective layer disposed on the display medium layer and covering the display medium layer; a backplane disposed on a first surface of the substrate; and a sealant at least surrounding a first side surface of the substrate, a second side surface of the display medium layer, and wrapping at least a portion of the driving component and a portion of the flexible printed circuit.

A method of fabricating the display device according to another exemplary embodiment of the present invention includes the following steps. A substrate having a first surface, a second surface and a first side surface is provided. A backplane is disposed on the first surface of the substrate. A display medium layer is disposed on the second surface of the substrate. A driving component is connected to the substrate. A flexible printed circuit is disposed on the substrate to electrically connect to the driving component. A protective layer is disposed on the display medium layer to cover the display medium layer. A sealant is formed to at least surround the first side surface of the substrate, a second side surface of the display medium layer, and to wrap at least a portion of the driving component and a portion of the flexible printed circuit.

By virtue of the design of the display device according to the exemplary embodiment of the present invention, no warpage would occur in the high temperature process. In addition, the sealant is able to protect the periphery of the first side surface of the substrate, the periphery of the second side surface of the display medium layer, the driving component and the flexible printed circuit, and thus the package process is simplified.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1A:
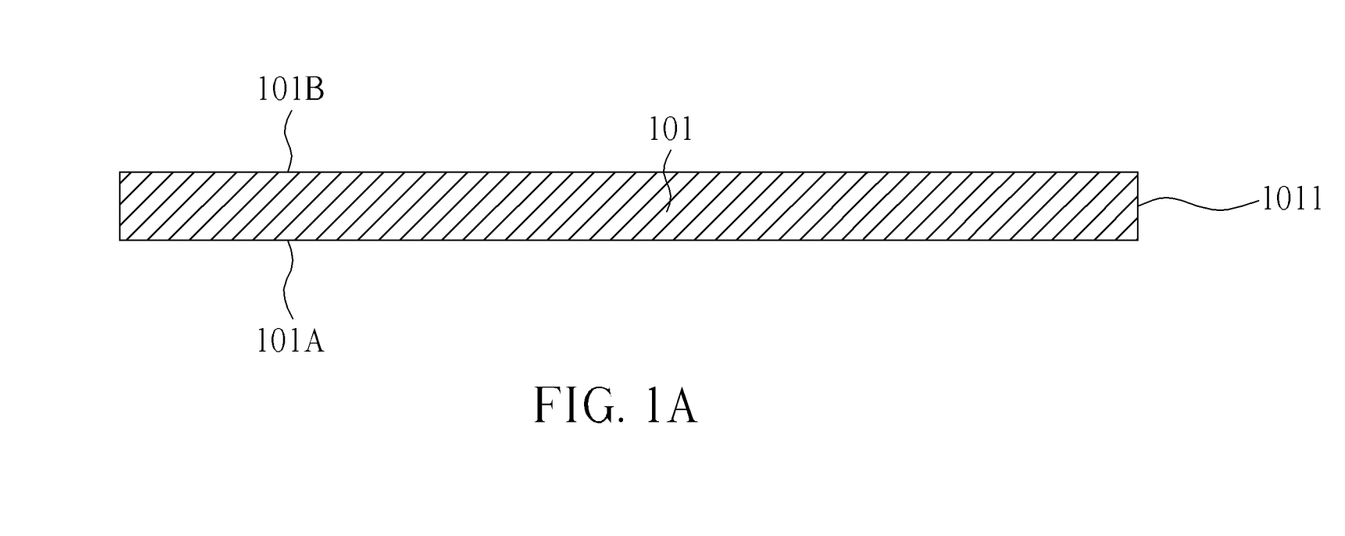
FIG. 1A-FIG. 1F are cross-sectional views illustrating a display device according to a first exemplary embodiment of the present invention.
Figure 1B:
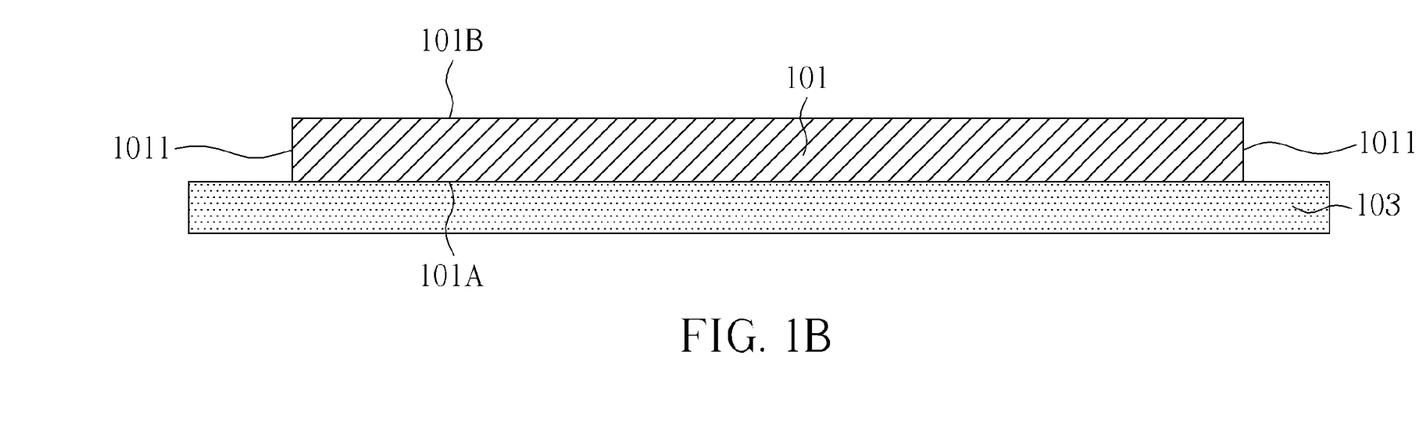

Please refer to FIG. 1A-FIG. 1F. FIG. 1A-FIG. 1F are cross-sectional views illustrating a display device according to a first exemplary embodiment of the present invention. As shown in FIG. 1A, a substrate 101 is provided. The substrate 101 may be a flexible substrate such as a plastic substrate, or a hard substrate such as a glass substrate or a quartz substrate. Additionally, the substrate 101 has a first surface (rear surface) 101A, a second surface (front surface) 101B and a first side surface 1011, wherein the first side surface 1011 is individually connected to the first surface 101A and the second surface 101B, and the first side surface 1011 is between the first surface 101A and the second surface 101B. The first side surface 1011 may be one of the side surfaces of the substrate 101, and may be the side surface surrounded to the substrate 101. An active component array (not illustrated) is disposed on the second surface 101B. In this exemplary embodiment, the active component array may be a thin film transistor (TFT) array, but not limited thereto. As shown in FIG. 1B, a backplane 103 is disposed on the first surface 101A of the substrate 101 by pasting or coating. In this embodiment, the area of the backplane 103 is substantially larger than the area of the substrate 101, but not limited thereto. To solve the problems of warpage or breaking of the substrate 101 in the high temperature process as a result of the unmatched coefficients of thermal expansion (CTE) between the substrate 101 and the flexible layers, in this exemplary embodiment, the coefficient of thermal expansion of the backplane 103 is substantially equal to the overall coefficient of thermal expansion of the flexible layers, which includes the display medium layer, the protective layer and etc. As two materials having different coefficient of thermal expansion overlap with each other, the overall coefficient of thermal expansion ($\alpha$) could be obtained by the formula: $E_1 * t_1 * (\alpha_1 - \alpha) = E_2 * t_2 * (\alpha - \alpha_2)$, in which $E_1, t_1, \alpha_1, E_2, t_2, \alpha_2$ stand for the Young's modulus ($E_x$), thickness ($t_x$), coefficient of thermal expansion (CTE, $\alpha_x$) of the two different materials, respectively. In other words, the overall coefficient of thermal expansion for the flexible layers disposed on the substrate 101 can be calculated out from the formula described above. In this embodiment of the present invention, the coefficient of thermal expansion of the backplane 103 is substantially the same as the overall coefficient of thermal expansion of the flexible layers on the substrate 101, and it results in the same stress between two sides of substrate 101. It is noted that the two sides of substrate 101 are the first surface 101A (disposing on the backplane 103) and the second surface 101B (disposing on flexible layers). Accordingly, the warpage can be prevented because the stress of the backplane 103 substantially equals the stress of the flexible layers disposed on the substrate 101. The material of the backplane 103 includes polyethylene terephthalate (PET), polyethylene naphthalate (PEN) or polyimide (PI), but not limited thereto.

Figure 1C:
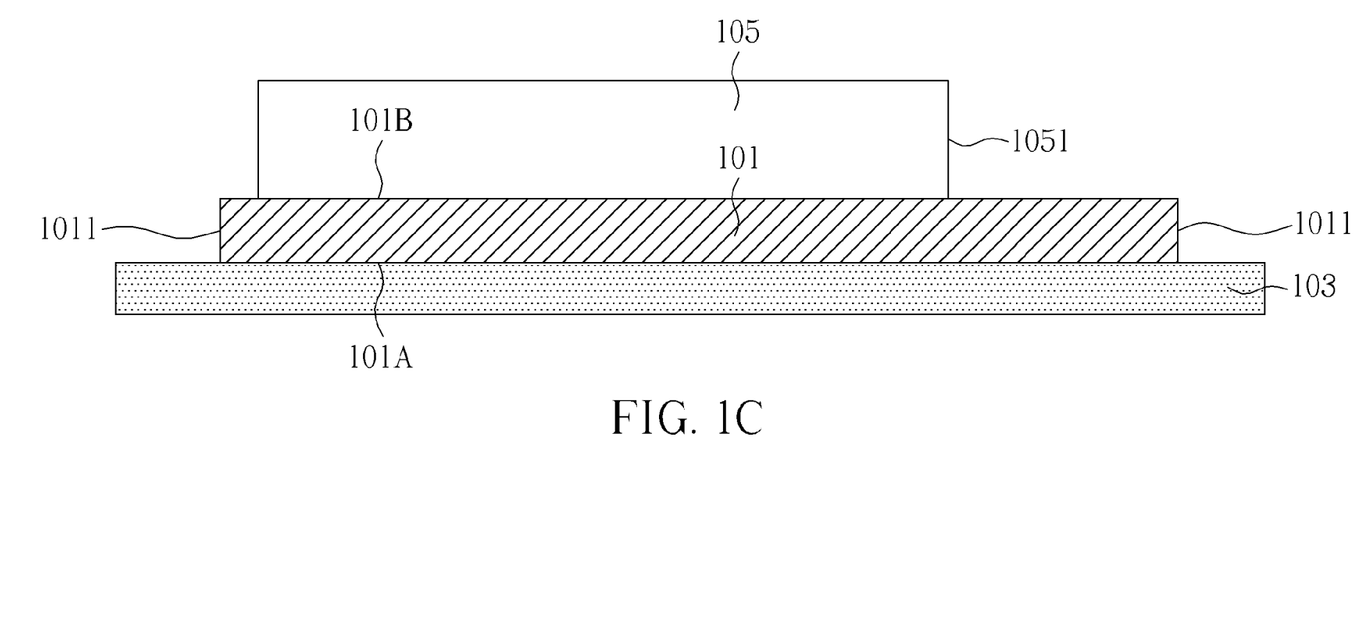
Figure 1D:
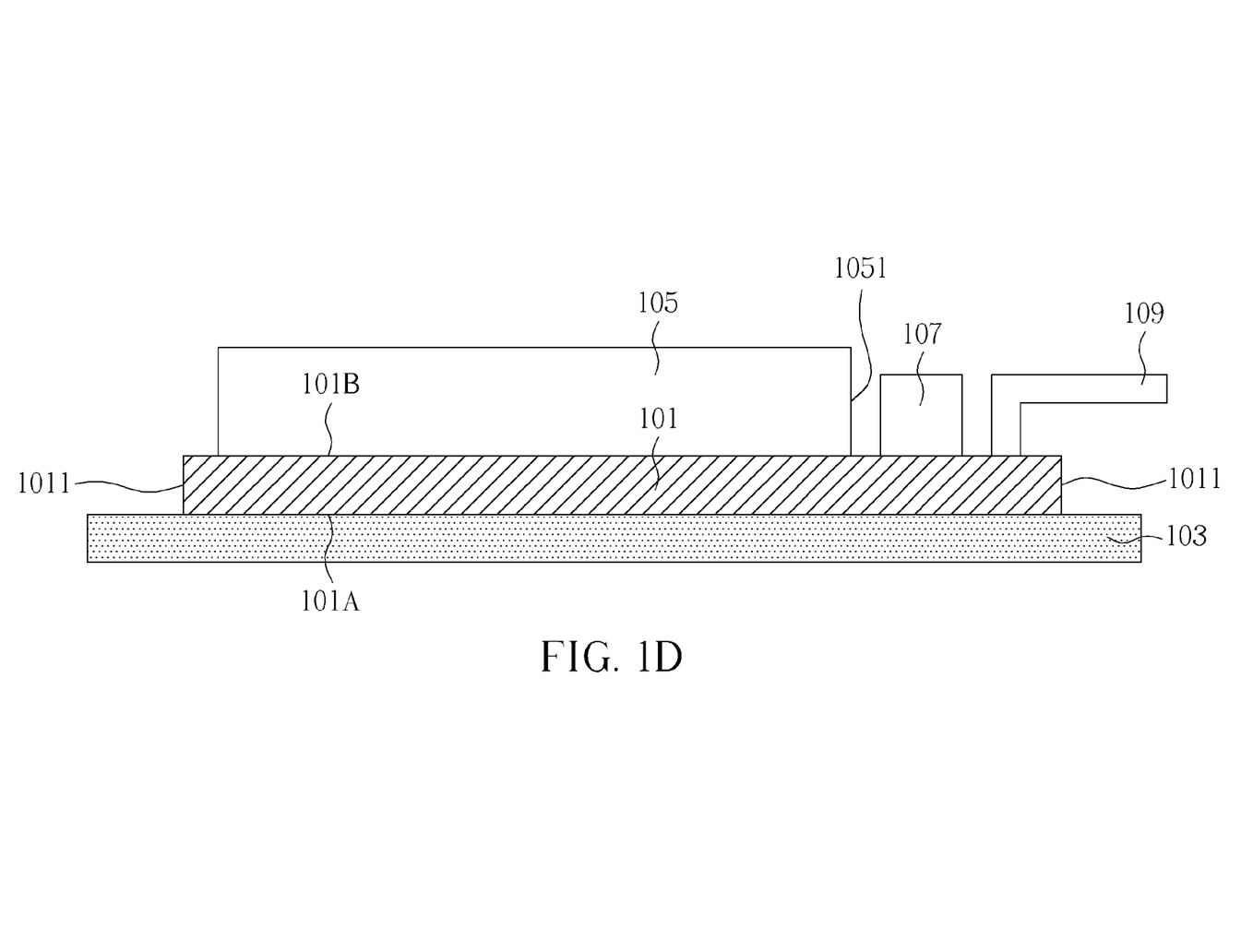

Next, as shown in FIG. 1C, a display medium layer 105 is disposed on the second surface 101B of the substrate 101. The display medium layer 105 has a second side surface 1051, and the display medium layer 105 may be controlled by the active component array disposed on the substrate 101 to provide images. In this exemplary embodiment, for instance, electrophoretic display film (EPD film) is utilized as the display medium layer 105. The display medium layer 105, however, could also be cholesterol liquid crystal layer, organic light emitting layer, electro-chromic display layer and etc., but not limited thereto. As shown in FIG. 1D, a driving component 107 and a flexible printed circuit 109 are individually electrically connected to and attached to the second surface 101B of the substrate 101, and the driving component 107 and the flexible printed circuit 109 are disposed adjacent to the second side surface 1051 of the display medium layer 105. The driving component 107 is electrically connected to the flexible printed circuit 109 and is used to drive the active component array disposed on the substrate 101. The driving component 107 may be disposed on the substrate 101 by chip on glass (COG) method. In this embodiment, the driving component 107 and the flexible printed circuit 109 may be individually disposed on the second surface 101B of the substrate 101.

Figure 1E:
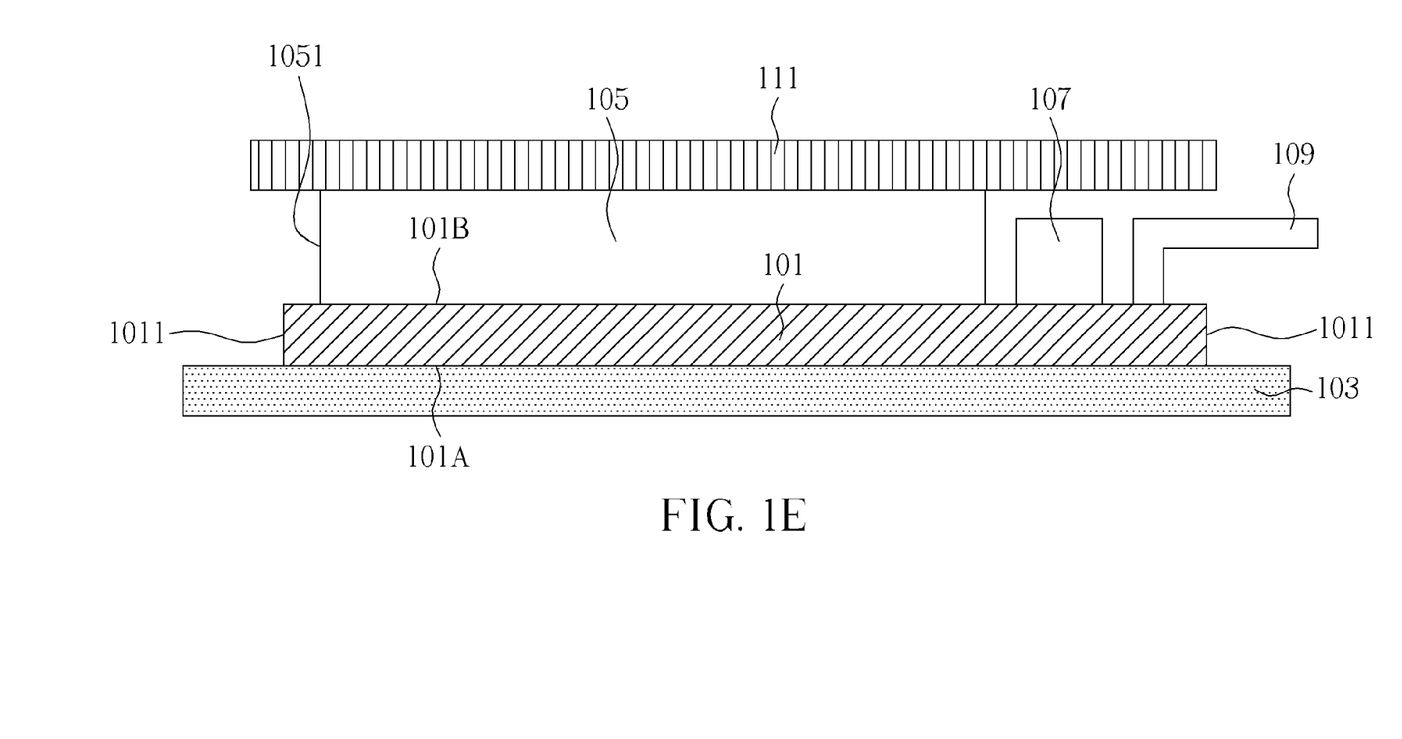

As shown in FIG. 1E, to prevent moisture and oxygen from permeating into the display medium layer 105 to deteriorate its performance, a protective layer 111 is formed on the display medium layer 105. The protective layer 111 also overlaps with the driving component 107 and a portion of flexible printed circuit 109 in the vertical projection direction. Therefore, the area of the protective layer 111 may be substantially larger than the area of the substrate 101, but not limited thereto. The protective layer 111 is also supposed to possess good abilities to resist moisture and oxygen. In this exemplary embodiment, electrophoretic display film is used as the display medium layer 105, and the water-resistance (if measured by water vapor transmission rates (WVTR)) is necessary to be at least smaller than $10^{-2}$ g/m² day. The material of the protective layer 111 may include organic material, inorganic material, or the mixture of organic material and inorganic material. The inorganic material could be metal oxide or metal nitride, such as $SiO_x$, $SiN_x$, $TiO_x$, $Al_2O_3$ or other mixtures such as $AlO_xN_y$, $SiO_xN_y$. The mixture of organic material and inorganic material can be prepared, for instance, by adding inorganic powder into organic polymer, or by stacking organic material and inorganic material to form multi-layered mixture. The protective layer 111 may also be glass or a touch panel. When touch panel is used as the protective layer 111, the display device may also implement touch control function.

Figure 1F:
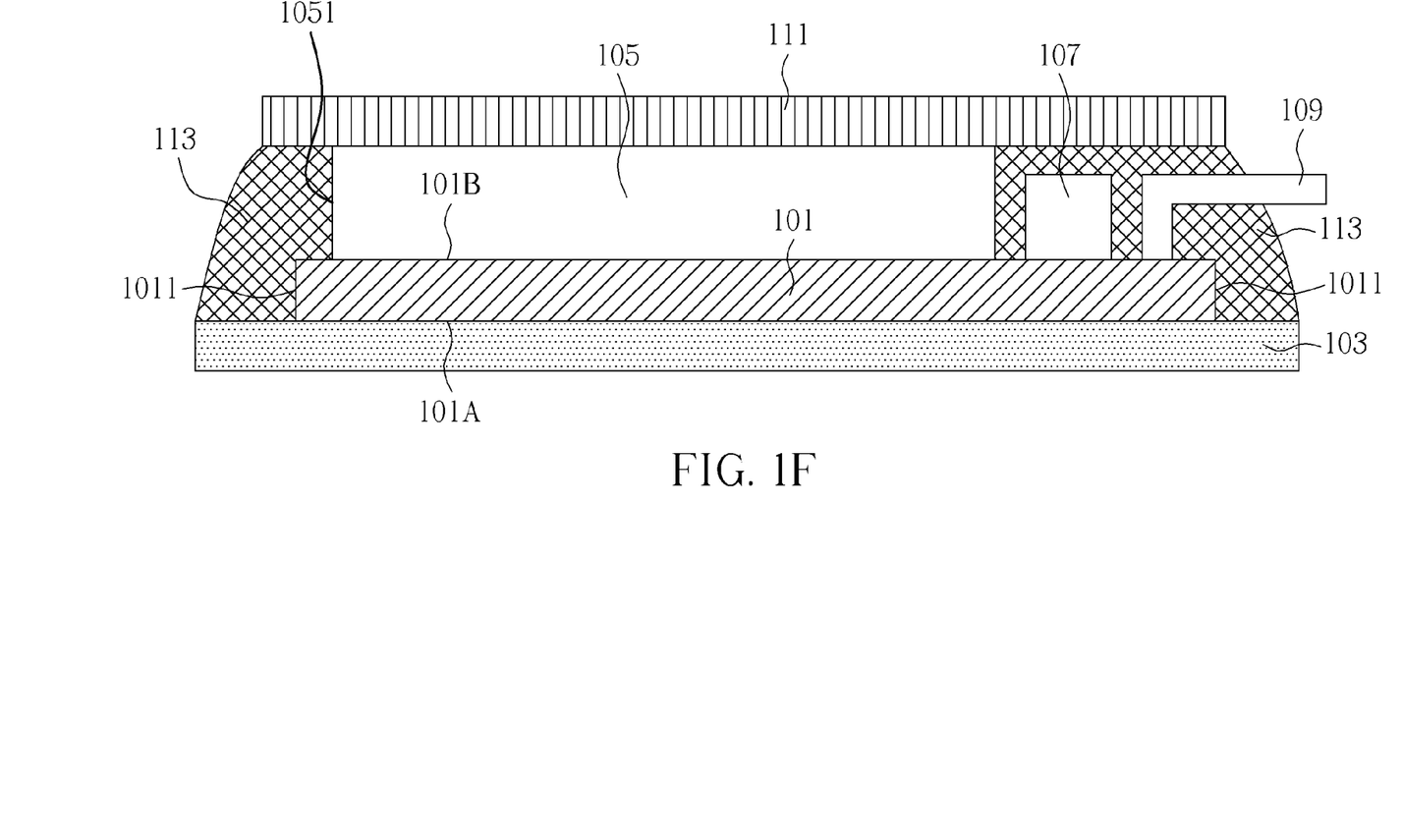

As shown in FIG. 1F, a sealant 113 is formed around the second side surface 1051 of the display medium layer 105 and the first side surface 1011 of the substrate 101. The sealant 113 is disposed between the protective layer 111 and the backplane 103, not only surrounds and seals the second side surface 1051 of the display medium layer 105 and the first side surface 1011 of the substrate 101, but also wraps the driving component 107 and a portion of the flexible printed circuit 109 disposed on the substrate 101. In this exemplary embodiment, the sealant 113 wraps the overall driving component 107, but not limited thereto, it is also feasible that the sealant 113 may only wrap a portion of the driving component 107. The sealant 113 may be formed, for instance, by dropping liquid adhesive material on the substrate 101, and this liquid adhesive material would extend to the second side surface 1051 of the display medium layer 105 and the first side surface 1011 of the substrate 101, and further wraps and seals the second side surface 1051 of the display medium layer 105 and the first side surface 1011 of the substrate 101 due to capillarity phenomenon. Subsequently, the liquid adhesive material is cured to form the sealant 113. The material of the liquid adhesive material may include thermosetting adhesive which can be hardened by thermal treatment, optical curable adhesive which can be hardened by exposure, or optical curable thermosetting adhesive which can be hardened by exposure followed by thermal treatment.

The possible routes for moisture and oxygen to permeate the display device are not only through the upper surface of the display medium layer 105, but also through the second side surface 1051 of the display medium layer 105. Therefore, this exemplary embodiment utilizes the sealant 113 for totally sealing the second side surface 1051 of the display medium layer 105. When the sealant 113 surrounds and seals the display medium layer 105 and the substrate 101, the sealant 113 wraps the driving component 107 and a portion of the flexible printed circuit 109 as well. This procedure facilitates the characters of moisture-resistance, insulation, thermal stability and mechanical characteristics of display device, and further simplifies the package process. In addition, if this exemplary embodiment utilizes glass as the substrate 101, the first side surface 1011 of the glass substrate tends to be broken under the stress when the area of the glass substrate is large or when the glass substrate is cut. Therefore, the procedure of using the sealant 113 to surround and seal the first side surface 1011 of the glass substrate also strengthens the protection of the first side surface 1011 of the glass substrate.

The package structure of display device is not limited to the described exemplary embodiment of the present invention. Other exemplary embodiments and varied embodiments will be disclosed in the following paragraph. To simplify the explanation and to clarify the comparison, the same components are denoted by the same numerals, and the repeated part will be omitted.

Figure 2:
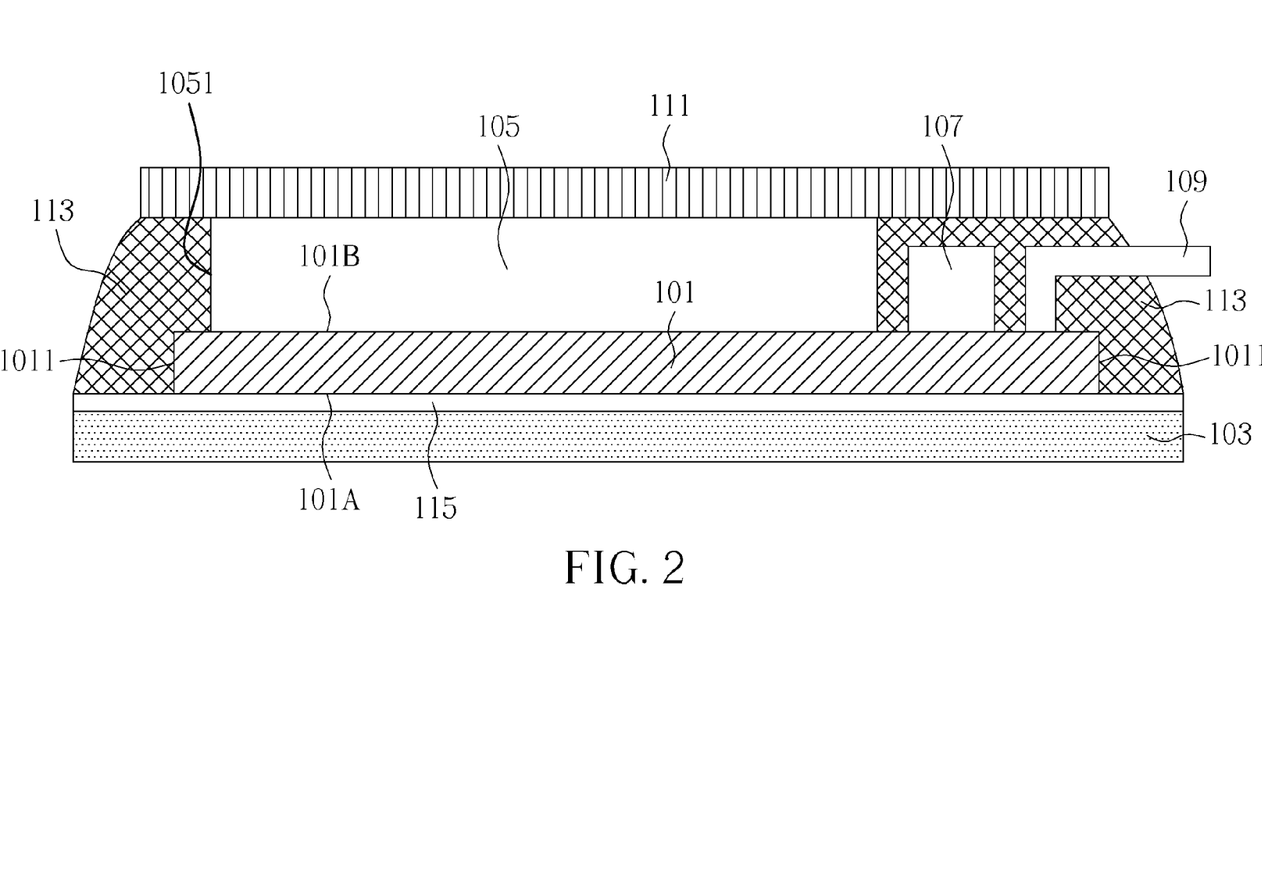
FIG. 2 is a cross-sectional view illustrating a package structure of display device according to a variant of the first exemplary embodiment of the present invention.

Please refer to FIG. 2. FIG. 2 is a cross-sectional view illustrating a package structure of display device according to a variant of the first exemplary embodiment of the present invention. As shown in FIG. 2, in this exemplary embodiment, when a material with poor water-resistance and poor oxygen-resistance such as a plastic substrate (e.g. a polyimide substrate) is utilized as the substrate 101, in addition to the sealant 113 which surrounds and seals the first side surface 1011 of the substrate 101, an additional water-resistant layer 115 may be disposed between the substrate 101 and the backplane 103 to prevent moisture and oxygen from passing through the first surface 101A of the substrate 101 to permeate the display medium layer 105. The material of the water-resistant layer 115 could be organic material, inorganic material, a mixture of organic material and inorganic material, or metal. The water-resistant layer 115 assists overall prevention from moisture or oxygen.

Figure 3:
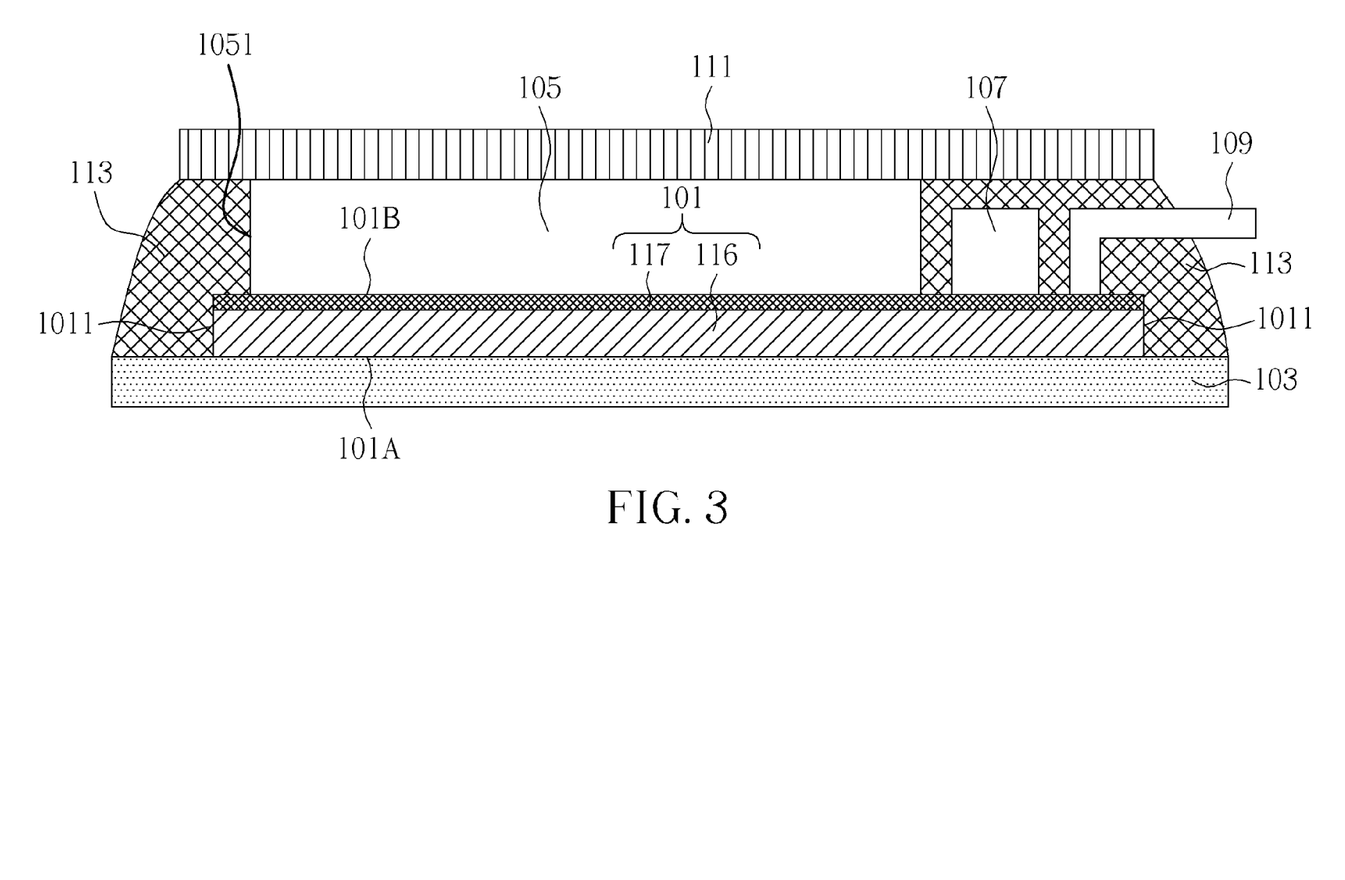
FIG. 3 is a cross-sectional view illustrating a package structure of display device according to another variant of the first exemplary embodiment of the present invention.

Please refer to FIG. 3. FIG. 3 is a cross-sectional view illustrating a package structure of display device according to another variant of the first exemplary embodiment of the present invention. As mentioned in the first exemplary embodiment, when the material of the substrate 101 is glass, the sealant 113 could be used to protect the first side surface 1011 of the substrate 101. However, it is possible that external force impacts on the first surface 101A of the substrate 101 to cause the substrate 101 to be broken. Once the substrate 101 is broken to influence the active component array, the active component array disposed on the substrate 101 will not be able to drive the display medium layer 105. Therefore, as shown in FIG. 3, in this exemplary embodiment, the substrate 101 may be a multi-layered composite substrate. The multi-layered composite substrate may include a glass substrate 116, and a buffer layer 117 disposed on the glass substrate 116. The active component array is disposed on the buffer layer 117. The material of the buffer layer 117 could be organic material including polyethylene naphthalate (PEN), polyethylene terephthalate (PET), polystyrene (PS) or polyimide (PI) etc., but not limited thereto. The buffer layer 117 is able to release and absorb impact energy. Accordingly, even if the glass substrate 116 is broken, the buffer layer 117 may still keeps undamaged, and thus the active component array disposed on the buffer layer 117 can operate normally.

Figure 4A:
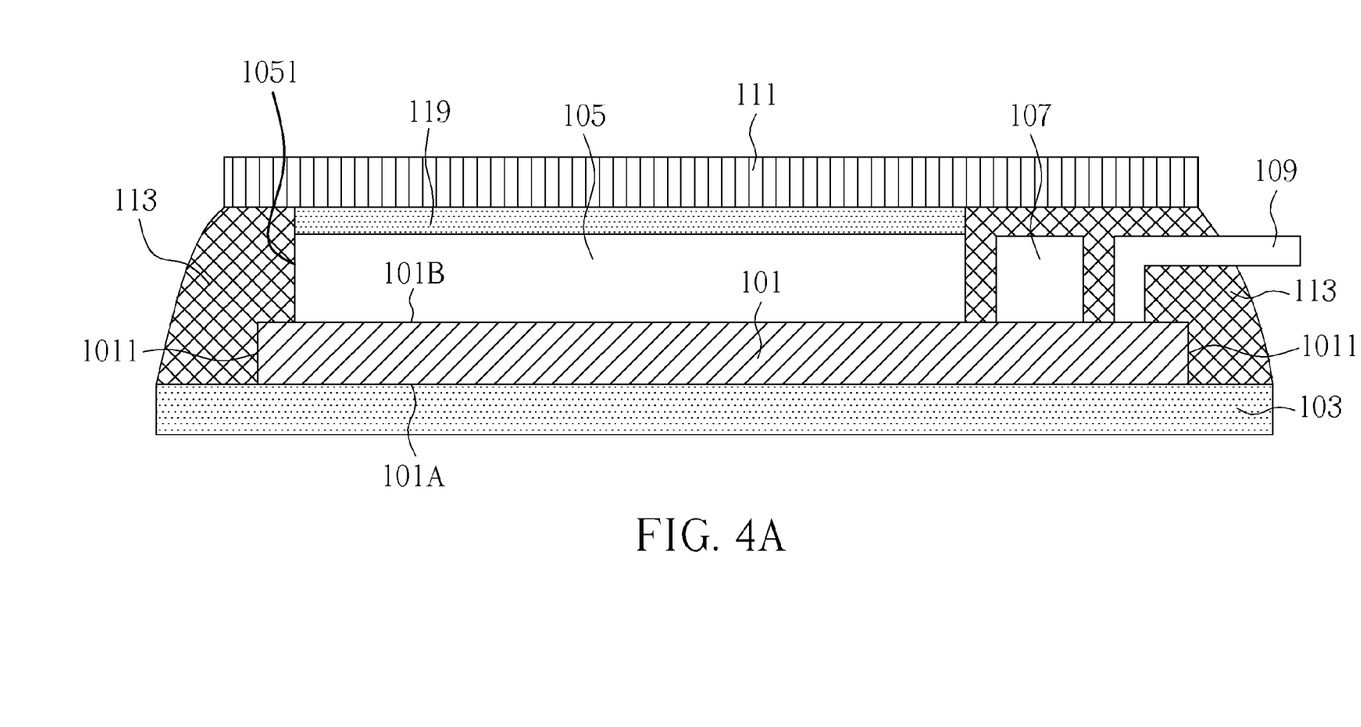
FIG. 4A-FIG. 4B are cross-sectional views illustrating package structures of display device according to another two variants of the first exemplary embodiment of the present invention.
Figure 4B:
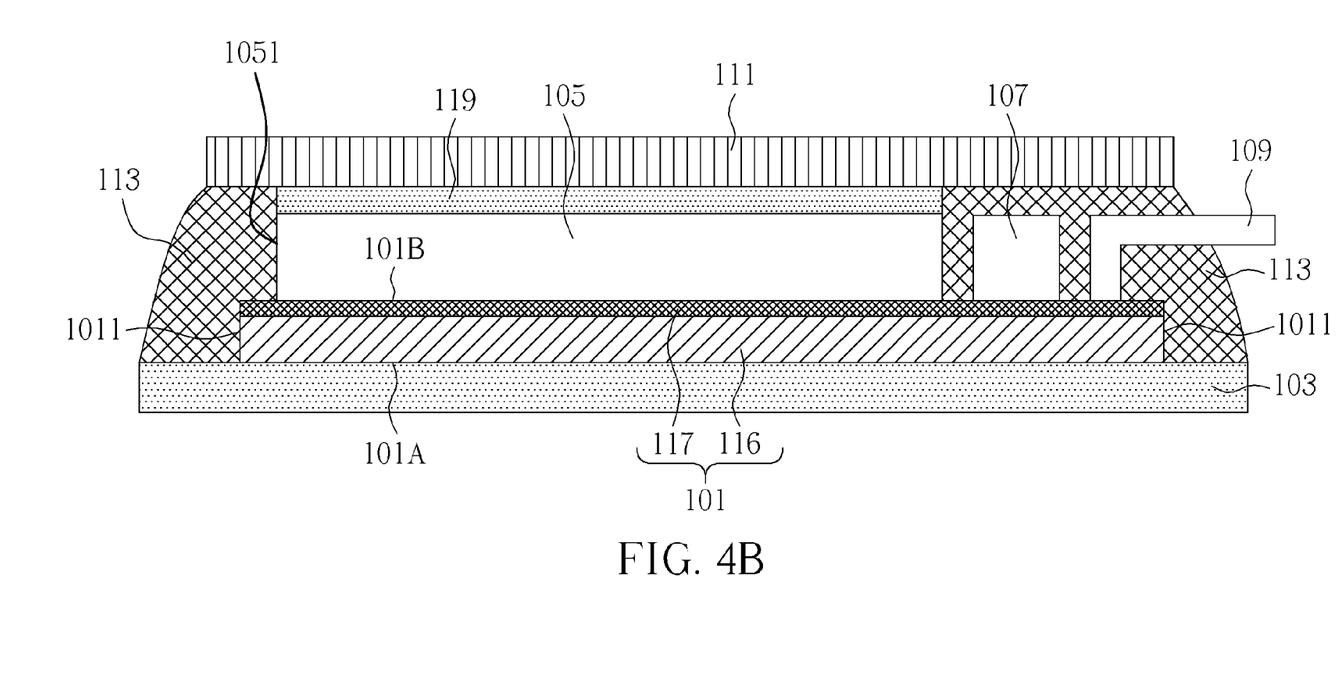

Please refer to FIG. 4A-FIG. 4B. FIG. 4A-FIG. 4B are cross-sectional views illustrating package structures of display device according to another two variants of the first exemplary embodiment of the present invention. As shown in FIG. 4A, the package structures of display device of FIG. 4A and FIG. 1F are similar, however, to enable the touch control function of display device, in this exemplary embodiment, the protective layer 111 is a touch panel, and a touch control layer 119 is disposed between the display medium layer 105 and the protective layer 111. Furthermore, as shown in FIG. 4B, the package structures of display device of FIG. 4B and FIG. 3 are similar, however, to enable the touch control function of display device, the touch control layer 119 can be disposed between the display medium layer 105 and the protective layer 111.

Figure 5:
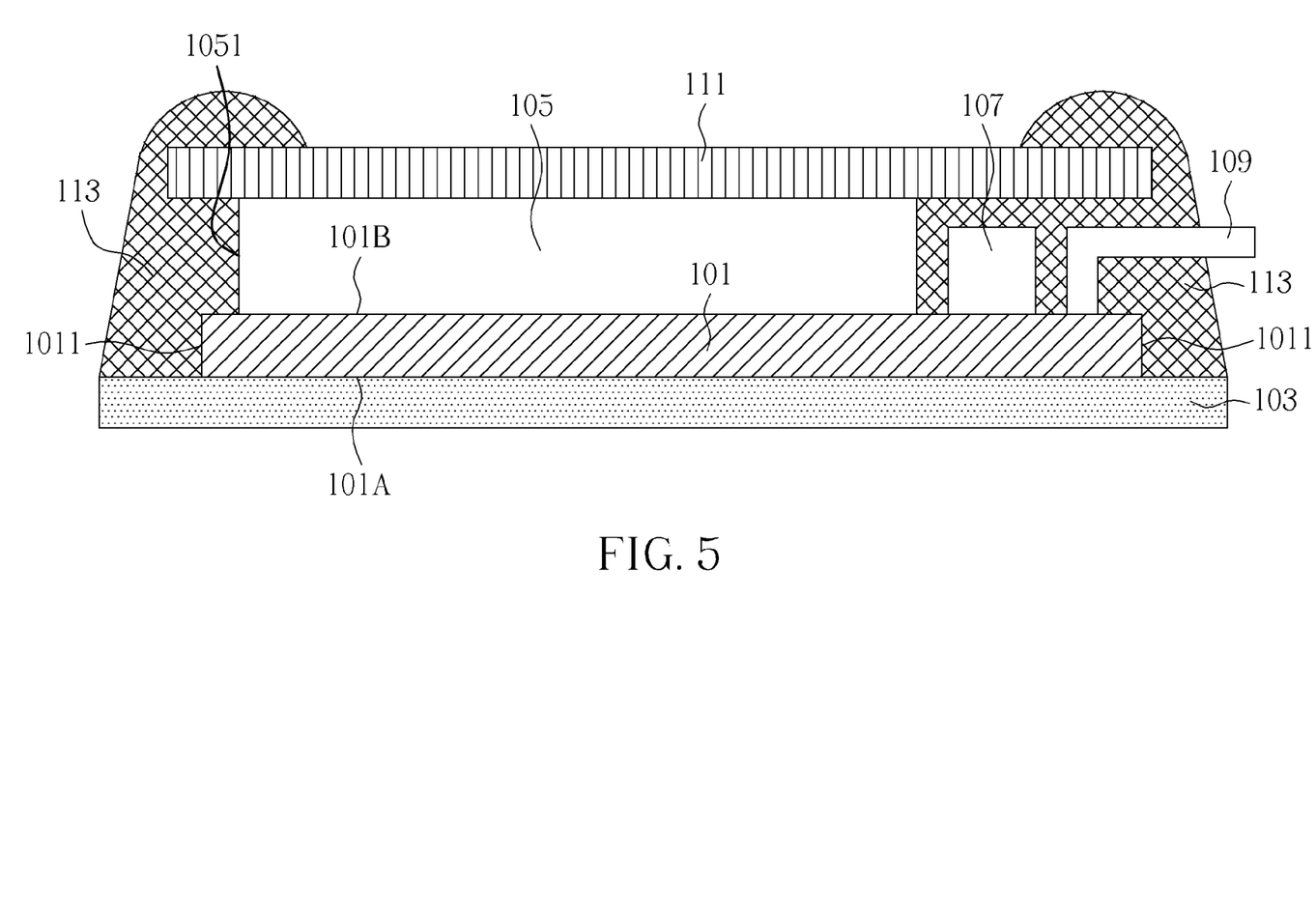
FIG. 5 is a cross-sectional view illustrating a package structure of display device according to still another variant of the first exemplary embodiment of the present invention.

Please refer to FIG. 5. FIG. 5 is a cross-sectional view illustrating a package structure of display device according to still another variant of the first exemplary embodiment of the present invention. Different from the first exemplary embodiment, in this exemplary embodiment, the sealant 113 further surrounds the side surface of the protective layer 111 and wraps the periphery of the upper surface of the protective layer 111.

Figure 6:
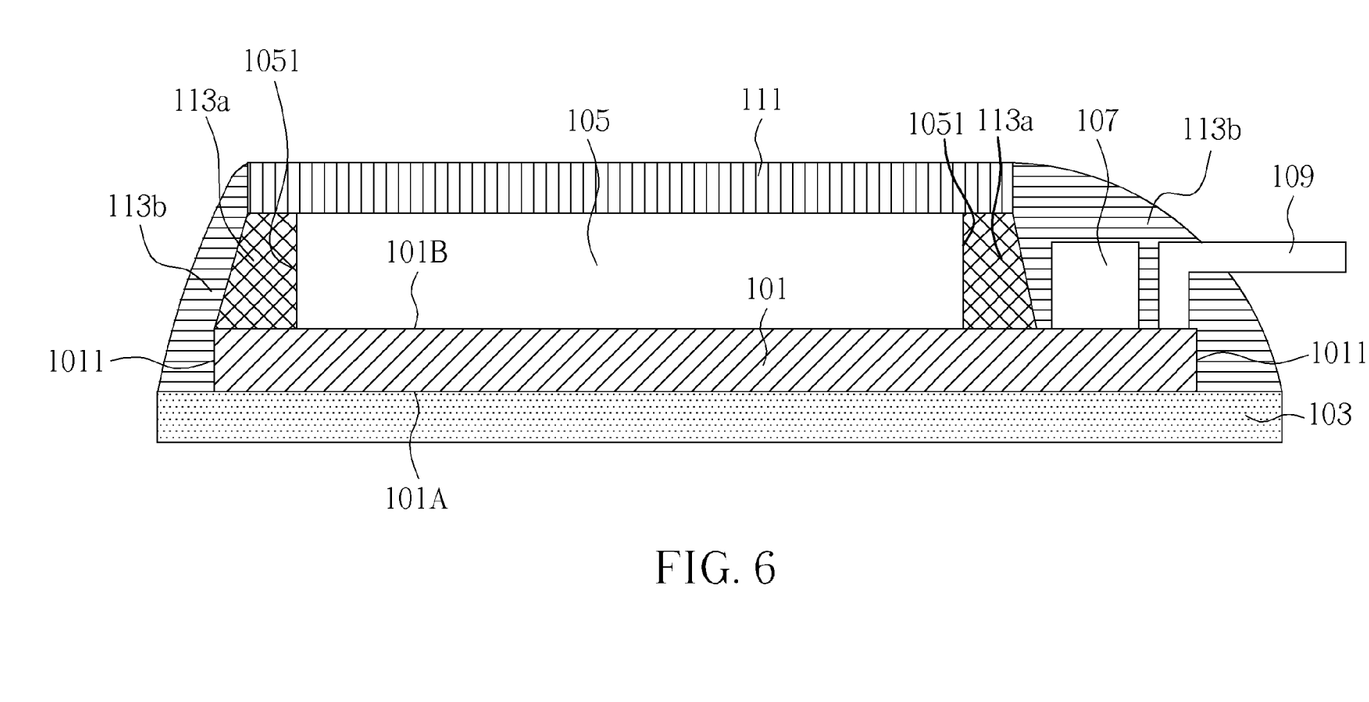
FIG. 6 is a cross-sectional view of a package structure of display device according to a second exemplary embodiment of the present invention.

Please refer to FIG. 6. FIG. 6 is a cross-sectional view of a package structure of display device according to a second exemplary embodiment of the present invention. Since the material of substrate 101 differs from the material of display medium layer 105, the requirements of water-resistance and moisture-resistance for these two materials are different. Therefore, the step for forming the sealant 113 on the second side surface 1051 of the display medium layer 105 and on the first side surface 1011 of the substrate 101 may be carried out in different steps. Consequently, different types of sealant 113 with different water vapor transmission rates or oxygen transmission rates could be selected for the substrate 101 and the display medium layer 105, respectively. As shown in FIG. 6, a first sealant 113a is disposed between the substrate 101 and the protective layer 111, and the first sealant 113a surrounds the second side surface 1051 of the display medium layer 105. Subsequently, a second sealant 113b is disposed on the backplane 103. The second sealant 113b surrounds the first sealant 113a, the protective layer 111, and the first side surface 1011 of the substrate 101, and the second sealant 113b wraps the driving component 107 and a portion of the flexible printed circuit 109 as well.

Figure 7:
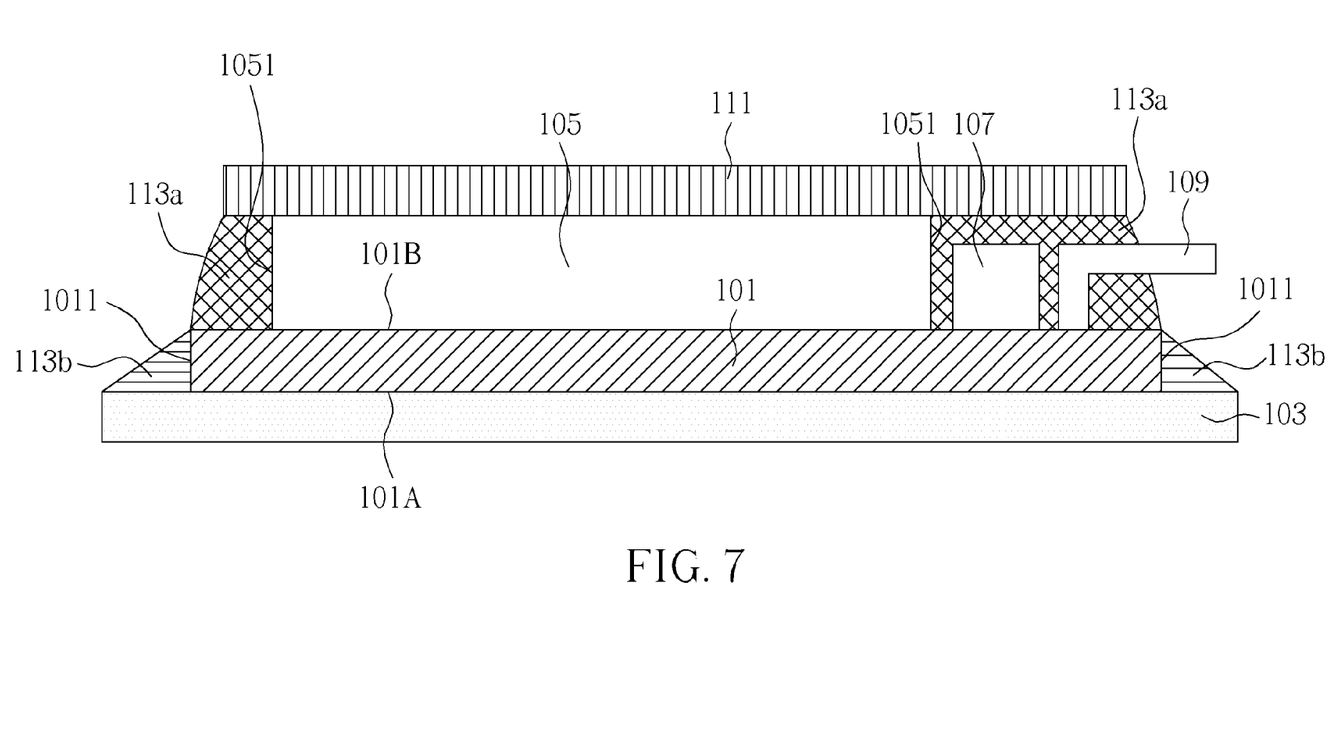
FIG. 7 is a cross-sectional view of a package structure of display device according to a third exemplary embodiment of the present invention.

Please refer to FIG. 7. FIG. 7 is a cross-sectional view of a package structure of display device according to a third exemplary embodiment of the present invention. The distinction between the exemplary embodiment in FIG. 1F and the exemplary embodiment in FIG. 7 is the disposition of the sealant 113. The steps for forming the sealant 113 are illustrated as below. At first, a first sealant 113a is disposed between the substrate 101 and the protective layer 111. The first sealant 113a surrounds the second side surface 1051 of the display medium layer 105, and also wraps the driving component 107 and a portion of the flexible printed circuit 109. Then, a second sealant 113b is disposed on the backplane 103. The second sealant 113b surrounds the first side surface 1011 of the substrate 101. Particularly, the disposition of the sealant 113 in FIG. 5 could also be adopted in the exemplary embodiments of FIG. 6 and FIG. 7, that is, the first sealant 113a can surround the side surface of the protective layer 111 and wrap the periphery of the upper surface of the protective layer 111 as well. Additionally, the first sealant 113a is intended to surround and protect the second side surface 1051 of the display medium layer 105, so the first sealant 113a should possess ability to resist moisture and oxygen, and the water-resistance is necessary to be at least smaller than 10 g/m$^2$ day. As glass substrate is used as the substrate 101 in the second exemplary embodiment and the third exemplary embodiment, because of the individual characters of moisture-resistance and oxygen-resistance of glass substrate, the ability of the second sealant 113b to resist moisture and oxygen is not requested especially.

In conclusion, a backplane is added to the rear of the display device of the present invention, and the coefficient of thermal expansion of the backplane is substantially equal to the overall coefficient of thermal expansion of the flexible layers on the substrate for reducing warpage of the display device as a result of the unmatched coefficients of thermal expansion in the high temperature process. Additionally, a sealant is provided to surround the second side surface of the display medium layer, the first side surface of the substrate, and to wrap at least a portion of the driving component and a portion of the flexible printed circuit for protection. In addition to preventing moisture and oxygen from permeating into the display medium layer to deteriorate its performance, extra step for forming protective glue on the driving component and the flexible printed circuit is not required. Consequently, the package process is simplified.

Those skilled in the art will readily observe that numerous modifications and alterations of the device and method may be made while retaining the teachings of the invention.

What is claimed is:

1. A display device, comprising:
   a substrate having a first surface, a second surface and a first side surface;
   a display medium layer disposed on the second surface and having a second side surface;
   a driving component disposed on the substrate;
   a flexible printed circuit (FPC) disposed on the substrate, wherein the flexible printed circuit is electrically connected to the driving component;
   a protective layer disposed on the display medium layer, wherein the protective layer covers the display medium layer;
   a backplane disposed on the first surface of the substrate, wherein a coefficient of thermal expansion (CTE) of the backplane is substantially equal to an overall coefficient of thermal expansion of a combination of the display medium layer and the protective layer; and
   a sealant disposed between the backplane and the protective layer, wherein the sealant surrounds the first side surface and the second side surface, and the sealant wraps at least a portion of the driving component and a portion of the flexible printed circuit.

2. The display device of claim 1, wherein a material of the backplane comprises polyethylene naphthalate (PEN), polyethylene terephthalate (PET) or polyimide (PI).

3. The display device of claim 1, wherein the sealant comprises:
   a first sealant surrounding the second side surface of the display medium layer and wrapping the driving component and a portion of the flexible printed circuit; and
   a second sealant surrounding the first side surface of the substrate.

4. The display device of claim 1, wherein the sealant comprises:
   a first sealant surrounding the second side surface of the display medium layer; and
   a second sealant surrounding the first side surface of the substrate, a side surface of the first sealant and a side surface of the protective layer, and wrapping the driving component and a portion of the flexible printed circuit.

5. The display device of claim 3, wherein the first sealant and the second sealant have different water vapor transmission rates (WVTR) or oxygen transmission rates (OTR).

6. The display device of claim 4, wherein the first sealant and the second sealant have different water vapor transmission rates or oxygen transmission rates.

7. The display device of claim 1, wherein a material of the sealant comprises thermosetting adhesive, optical curable adhesive or optical curable thermosetting adhesive.

8. The display device of claim 1, wherein the sealant surrounds a side surface of the protective layer, and wraps a periphery of an upper surface of the protective layer.

9. The display device of claim 1, wherein the protective layer comprises a glass or a touch panel.

10. The display device of claim 1, further comprising a touch control layer disposed between the display medium layer and the protective layer.

11. The display device of claim 1, further comprising a water-resistant layer disposed between the backplane and the substrate.

12. The display device of claim 11, wherein a material of the water-resistant layer comprises organic material, inorganic material, a mixture of organic material and inorganic material, or metal.

13. The display device of claim 1, wherein the substrate is a multi-layered composite substrate comprising a glass substrate and a buffer layer.

14. The display device of claim 13, wherein a material of the buffer layer comprises an organic material.

15. The display device of claim 14, wherein the organic material comprises polyethylene naphthalate (PEN), polyethylene terephthalate (PET), polystyrene (PS) or polyimide (PI).

16. The display device of claim 13, further comprising a touch control layer disposed between the display medium layer and the protective layer.

17. A method of fabricating a display device, comprising:
    providing a substrate, wherein the substrate has a first surface, a second surface and a first side surface;
    disposing a backplane on the first surface of the substrate;
    disposing a display medium layer on the second surface of the substrate, wherein the display medium layer has a second side surface;
    disposing a driving component on the substrate;
    disposing a flexible printed circuit (FPC) to the substrate, and electrically connecting the flexible printed circuit to the driving component;
    disposing a protective layer on the display medium layer, wherein the protective layer covers the display medium layer, and a coefficient of thermal expansion (CTE) of the backplane is substantially equal to an overall coefficient of thermal expansion of a combination of the display medium layer and the protective layer; and
    forming a sealant, wherein the sealant surrounds the first side surface of the substrate and the second side surface of the display medium layer, and wraps at least a portion of the driving component and a portion of the flexible printed circuit.

18. The method of fabricating the display device of claim 17, wherein a material of the backplane comprises polyethylene naphthalate (PEN), polyethylene terephthalate (PET) or polyimide (PI).

19. The method of fabricating the display device of claim 17, wherein steps for forming the sealant comprise:
    forming a first sealant surrounding the second side surface of the display medium layer; and
    forming a second sealant surrounding a side surface of the first sealant, the first side surface of the substrate, and a side surface of the protective layer, wherein the second sealant wraps the driving component and a portion of the flexible printed circuit.

20. The method of fabricating the display device of claim 17, wherein steps for forming the sealant comprise:
    forming a first sealant surrounding the second side surface of the display medium layer, wherein the first sealant wraps the driving component and a portion of the flexible printed circuit; and
    forming a second sealant surrounding the first side surface of the substrate.

21. The method of fabricating the display device of claim 19, wherein the first sealant and the second sealant comprise different water vapor transmission rates (WVTR) and oxygen transmission rates (OTR).

22. The method of fabricating the display device of claim 20, wherein the first sealant and the second sealant comprise different water vapor transmission rates and oxygen transmission rates.

23. The method of fabricating the display device of claim 17, wherein a material of the sealant comprises thermosetting adhesive, optical curable adhesive or optical curable thermosetting adhesive.

24. The method of fabricating the display device of claim 17, further comprising a water-resistant layer disposed between the backplane and the substrate.

25. The method of fabricating the display device of claim 17, wherein the substrate is a multi-layered composite substrate comprising a glass substrate and a buffer layer.

26. The method of fabricating the display device of claim 25, wherein a material of the buffer layer comprises an organic material.

27. A display device, comprising:
- a substrate having a first surface, a second surface and a first side surface;
- a display medium layer disposed on the second surface and having a second side surface;
- a driving component disposed on the substrate;
- a flexible printed circuit (FPC) disposed on the substrate, wherein the flexible printed circuit is electrically connected to the driving component;
- a protective layer disposed on the display medium layer, wherein the protective layer covers the display medium layer;
- a backplane disposed on the first surface of the substrate; and
- a sealant disposed between the backplane and the protective layer, wherein the sealant surrounds the first side surface and the second side surface, the sealant wraps at least a portion of the driving component and a portion of the flexible printed circuit, the sealant comprises a first sealant surrounding the second side surface of the display medium layer and wrapping the driving component and a portion of the flexible printed circuit, and a second sealant surrounding the first side surface of the substrate, and the first sealant and the second sealant have different water vapor transmission rates (WVTR) or oxygen transmission rates (OTR).

28. A method of fabricating a display device, comprising:
- providing a substrate, wherein the substrate has a first surface, a second surface and a first side surface;
- disposing a backplane on the first surface of the substrate;
- disposing a display medium layer on the second surface of the substrate, wherein the display medium layer has a second side surface;
- disposing a driving component on the substrate;
- disposing a flexible printed circuit (FPC) to the substrate, and electrically connecting the flexible printed circuit to the driving component;
- disposing a protective layer on the display medium layer, wherein the protective layer covers the display medium layer; and
- forming a sealant comprising:
- forming a first sealant surrounding the second side surface of the display medium layer, wherein the first sealant wraps the driving component and a portion of the flexible printed circuit; and
- forming a second sealant surrounding the first side surface of the substrate, wherein the first sealant and the second sealant comprise different water vapor transmission rates and oxygen transmission rates.

* * * * *